(12) United States Patent
Cowans et al.

(10) Patent No.: US 7,178,353 B2
(45) Date of Patent: Feb. 20, 2007

(54) THERMAL CONTROL SYSTEM AND METHOD

(75) Inventors: Kenneth W. Cowans, Fullerton, CA (US); William W. Cowans, Fullerton, CA (US); Glenn W. Zubillaga, Canyon Lake, CA (US); Isaac Millan, Anaheim, CA (US)

(73) Assignee: Advanced Thermal Sciences Corp., Anaheim, CA (US)

( * ) Notice: Subject to any disclaimer, the term of this patent is extended or adjusted under 35 U.S.C. 154(b) by 54 days.

(21) Appl. No.: 11/057,383

(22) Filed: Feb. 15, 2005

(65) Prior Publication Data

US 2005/0183432 A1  Aug. 25, 2005

Related U.S. Application Data

(60) Provisional application No. 60/576,705, filed on Jun. 2, 2004, provisional application No. 60/546,059, filed on Feb. 19, 2004.

(51) Int. Cl.
*F25B 41/00* (2006.01)
*F25B 49/00* (2006.01)
*F25B 1/00* (2006.01)

(52) U.S. Cl. ............ 62/196.4; 62/222; 62/224; 62/513

(58) Field of Classification Search ........... 62/196.1, 62/196.4, 222, 224, 113, 513
See application file for complete search history.

(56) References Cited

U.S. PATENT DOCUMENTS

| | | | |
|---|---|---|---|
| 4,742,689 A | 5/1988 | Lowes | |
| 5,906,104 A | 5/1999 | Schwartz et al. | |
| 5,946,925 A | 9/1999 | Williams et al. | |
| 6,250,093 B1 * | 6/2001 | Fujii et al. | 62/228.3 |
| 6,279,331 B1 * | 8/2001 | Hirota | 62/117 |
| 6,644,048 B2 * | 11/2003 | Goth et al. | 62/158 |

* cited by examiner

*Primary Examiner*—Marc Norman
(74) *Attorney, Agent, or Firm*—Jones, Tullar & Cooper, PC; Raymond A. Bogucki (57) ABSTRACT

A system and method for controlling the temperature of a process tool uses the vaporizable characteristic of a refrigerant that is provided in direct heat exchange relation with the process tool. Pressurized refrigerant is provided as both condensed liquid and in gaseous state. The condensed liquid is expanded to a vaporous mix, and the gaseous refrigerant is added to reach a target temperature determined by its pressure. Temperature corrections can thus be made very rapidly by gas pressure adjustments. The process tool and the operating parameters will usually require that the returning refrigerant be conditioned and processed for compatibility with the compressor and other units, so that cycling can be continuous regardless of thermal demands and changes.

30 Claims, 8 Drawing Sheets

THERMAL CONTROL SYSTEM AND METHOD

REFERENCE TO PRIOR APPLICATIONS

This invention relies for priority on Provisional Patent Application No. 60/546,059 filed Feb. 19, 2004, entitled "Transfer Direct of Saturated Fluid System", and Provisional Application No. 60/576,705 filed Jun. 2, 2004, entitled "Transfer Direct Heat Exchanger System", both naming Kenneth W. Cowans, Glenn Zubillaga and William W. Cowans as inventors.

BACKGROUND OF THE INVENTION

Thermal control units (TCUs), such as heating and chilling systems are widely used to establish and maintain a process tool or other device at a selected and variable temperature. Typical examples of a modern thermal or temperature control unit are found in highly capital intensive semiconductor fabrication facilities. Stringent spatial requirements are placed on the TCUs, in order to preserve expensive floor space as much as possible. Reliability must be assured, because the large capital equipment costs required do not tolerate downtime in operation if profitable performance is to be obtained. The target temperature may be changed for different fabrication steps, but must be held closely until that particular step is completed. In many industrial and common household refrigeration systems the purpose is to lower the temperature to a selected level, and then maintain the temperature within a temperature range that is not highly precise. Thus even though reliable and long-lived operation is achieved in these commercial systems, the performance is not up to the demands of highly technical production machinery.

In most modern TCUs actual temperature control of the tool or process is exercised by use of an intermediate thermal transfer fluid which is circulated from the TCU through the equipment and back again in a closed cycle. A thermal transfer fluid is selected that is stable in a desired operating range below its boiling temperatures at the minimum operating pressure of said fluid. It also must have suitable viscosity and flow characteristics within its operating range. The TCU itself employs a refrigerant, usually now of an ecologically acceptable type, to provide any cooling needed to maintain the selected temperature. The TCU may circulate the refrigerant through a conventional liquid/vapor phase cycle. In such cycles, the refrigerant is first compressed to a hot gas at high pressure level, then condensed to a pressurized liquid. The gas is transformed to a liquid in a condenser by being passed in close thermal contact with a cooling fluid; it is either liquid cooled by the surrounding fluid or directly by environmental air. The liquid refrigerant is then lowered in temperature by expansion through a valve to a selected pressure level. This expansion cools the refrigerant by evaporating some of the liquid, thereby forcing the liquid to equilibrate at the lower saturation pressure. After this expansive chilling, the refrigerant is passed into heat exchange relation with the thermal transfer fluid to cool said thermal transfer fluid, in order to maintain the subject equipment at the target temperature level. Then the refrigerant is returned in vapor phase to the pressurization stage. A source of heating must usually be supplied to the thermal transfer fluid if it is needed to raise the temperature of the circulated thermal transfer fluid as needed. This is most often an electrical heater placed in heat exchange with the circulated fluid and provided with power as required.

Such TCUs have been and are being very widely used with many variants, and developments in the art have lowered costs and improved reliability for mass applications. In mass produced refrigerators, for example, tens of thousands of hours of operation are expected, and at relatively little cost for maintenance. However, such refrigeration systems are seldom capable of operating across a wide temperature range, and lower cost versions often use air flow as a direct heat exchange medium for the refrigerated contents.

In contrast, the modern TCU for industrial applications has to operate precisely, is a typical requirement being ±<1° C., at a selected temperature level, and shift to a different level within a wide range (e.g. −40° C. to +60° C. for a characteristic installation). Typical thermal transfer fluids for such applications include a mixture of ethylene glycol and water (most often in deionized form) or a proprietary perfluorinated fluid sold under the trademark "Galden" or "Fluorinert". These fluids and others have found wide use in these highly reliable, variable temperature systems. They do not, however, have high thermal transfer efficiencies, particularly the perfluorinated fluids, and impose some design demands on the TCUs. For example, energy and space are needed for a pumping system for circulating the thermal transfer fluid through heat exchangers (HEXs) and the controlled tool or other equipment. Along with these energy loss factors, there are energy losses in heat exchange due to the temperature difference needed to transfer heat and also losses encountered in the conduits coupling the TCU to and from the controlled equipment. Because space immediately surrounding the device to be cooled often at is a premium, substantial lengths of conduit may be required, which not only introduces energy losses but also increases the time required to stabilize the temperature of the process tool. In general the larger the volume of the TCU the farther the TCU needs to be located remotely from the device to be controlled. The fluid masses along the flow paths require time as well as energy to compensate for the losses they introduce. Any change in temperature of the device to be controlled must also affect the conduits connecting the TCU and the controlled device along with the thermal transfer fluid contained in said conduits. This is because the thermal transfer fluid is in intimate thermal contact with the conduit walls. Thus, the fluid emerging at the conduit end nearest the controlled device arrives at said device at a temperature substantially equal to that of the conduit walls and these walls must be changed in temperature before the controlled device can undergo a like change in temperature.

Under the continuing demand for improved systems and results, there is a need for a TCU which minimizes these losses. If possible, the system should also be compact, of low capital cost, and preserve or even increase the long life and reliable characteristics which have become expected.

To the extent that straightforward refrigeration systems may have hitherto employed a refrigerant without a separate thermal transfer fluid, it has been considered that the phase changes imposed during the refrigeration cycle prohibit direct use of the refrigerant at a physical distance outside the cycle. A conventional refrigerant inherently relies on phase changes for energy storage and conversion, so that there must also be a proper state or mix of liquid and vapor phases at each point in the refrigeration cycle for stable and reliable operation of the compressor and other components. Using a saturable fluid such as a refrigerant directly in heat exchange with a variable thermal load presents formidable system problems.

The present application teaches for the first time a system which directly employs the high thermal transfer efficiency of a refrigerant mixture of liquid and vapor in a highly efficient system capable of very fast temperature change response. It eliminates the need for substantial delay times to correct temperature levels at the device being controlled, as well as for substantial energy losses in conduits and HEXs, and the need for substantial time delays in shifting between target temperatures at different levels.

SUMMARY OF THE INVENTION

Systems and methods in accordance with the invention employ a variable phase refrigerant directly as a cooling or heating source throughout a wide temperature range and with high speed response and high thermal efficiency. The refrigerant is maintained as a saturated mix of liquid and vapor during the principal part of its thermal control range and in direct contact with a controlled unit functioning as a variable heat load. The temperature of controlled equipment can be adjusted very rapidly by variation of the pressure of the saturated fluid mix. The energy losses in conduits, HEXs and fluid masses are minimized and the delay in temperature response of the cooled device due to the change in temperature of these components is substantially eliminated.

Systems and methods in accordance with the invention, in more specific examples, compress a cycling refrigerant to a high temperature, high pressure state, but provide proportional control of a hot gas flow, as well as a separate flow of a condensed liquid/vapor mist. The liquid/vapor mist initially comprises an expanded flow of condensed refrigerant, but is combined with a proportioned flow of hot gas, determined by a controller, in accordance with a chosen set point for the controlled device. To this end the two flows are brought together in a mixing circuit, at which the saturated fluid is brought to a target temperature and pressure and a pressure drop is introduced in the expanded flow to compensate for flow nonlinearities inherent in the expansion valve device. The saturated fluid itself is then transported directly through the controlled process or equipment. The temperature of the controlled process or equipment is sensed and sent to the controller, which can vary the temperature of the controlled system rapidly simply by pressure change. By thus changing the temperature of the medium effecting the cooling or heating, such change in temperature can be made available to the controlled device nearly immediately following the pressure change. This eliminates many thermal energy losses and temperature changes arising from use of a separate thermal transfer fluid in contrast with the controlled device.

The invention herein disclosed thus effectively can apply cooling or heating to a controlled device rapidly enough so as to counteract the effects of a change in power applied to the controlled device and thereby keep the controlled device at an invariant temperature.

In moving the refrigerant through a complete continuous cycle for ultimate direct heat transfer, a number of novel expedients are utilized to assure that the phases of the refrigerant are stable throughout. At the compression step, for example, a balance of input temperature and pressure is maintained at the compressor by employing a desuperheater valve responsive to the compressor input temperature, and a feed-through loop with an electrical heater and heat exchange system is incorporated so as to assure that the input flow at the compressor input is raised to the proper range if necessary. This balance also assures that refrigerant returned to the compressor input is free of liquid as well as in a selected pressure range. In addition, input pressure to the compressor is limited by a close-on-rise valve in the return flow path from the controlled process.

The path for flow of condensed refrigerant includes an externally stabilized conventional refrigeration thermostatic expansion valve (TXV), while the hot gas bypass flow path to the mixing circuit includes a proportional (or proportioning) valve. The proportional valve is responsive to control signals from the controller system, which commands the proportions of flow to be such as to achieve the desired pressure and temperature of the delivered mixture.

The system can also heat outside the mixing range by utilizing only hot gas at the upper end of the temperature range. When a high control temperature is needed that is attainable by using hot pressurized gas only, the proportional valve is opened more fully and the thermal expansion valve is shut down by action of a spring-loaded check valve with a predetermined pressure relief load on the check valve's spring. The refrigerant may alternatively be heated externally to raise the temperature even more. In this latter case a counter-current HEX can also be employed to further extend the heating range upward in temperature in an efficient manner.

The system is arranged to enable the control of a unit across a range of temperatures in not only the mixed fluid and hot gas modes, but also in a chilling mode using only thermal expansion of pressurized ambient refrigerant.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
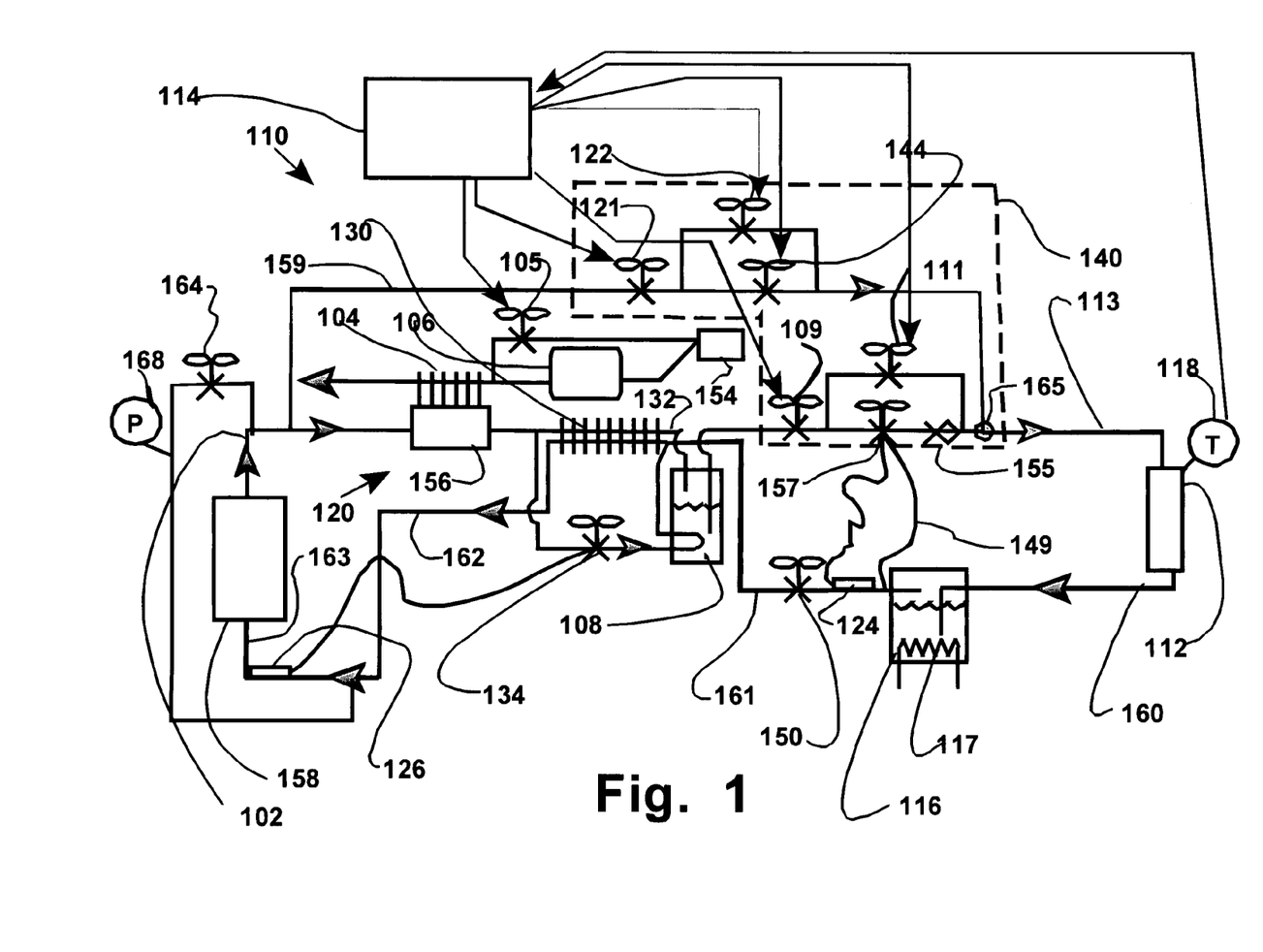
FIG. 1 is a block diagram of a temperature control unit in accordance with the invention.

A block diagram of a temperature control unit (TCU) 110 is depicted in FIG. 1 for operation principally in the range of approximately −50° C. to +140° C., by way of example only. Other temperature ranges may be utilized, depending upon the refrigerant and to some extent the load, but the example given assumes the use of refrigerant R507 as an example. TCU 110 can be a compact unit and is characterized by low cost as well as moderate size, enhanced economy and rapid response. Temperature levels are to be held stable at different target levels irrespective of the lengths of the lines coupling associated devices. The TCU 110 in this example is intended for the purpose of controlling the temperature of a tool 112, such as a cluster tool for semiconductor fabrication. Such tools have internal passageways for passage of a thermal control fluid. The TCU is intended to establish different target temperatures of the tool for operating cycles during different fabrication steps.

The system incorporates a controller 114, such as a proportional, integral, differential (PID) controller of the type described in U.S. Pat. No. 6,783,080 of Antoniou and Christofferson, which is suitable for receiving a number of different types of commands and includes a user-friendly setup system. In the TCU 110, a compressor 158 is employed which may be a highly reliable yet low-cost commercial refrigeration compressor providing a pressurized output of hot gas refrigerant at approximately 120° C. at 400 psi or more at the output line 102. The temperature at the tool 112 is sensed by a transducer 118 located at the tool 112 and a measurement signal is returned to the controller 114. This temperature signal is used in the controller 114 for different purposes. For example, it can control both the opening of a controllable proportional valve 144 which supplies hot gas directly from the compressor 58 output, and the flow of saturated fluid after liquefaction of the hot compressor output in condenser 156, so as to provide a mix of liquid and gas at a desired temperature to the controlled device 112.

For these purposes, the hot gas flow from the compressor 158 branches into two flow paths, one of which enters a compressor control system 120 including a conventional condenser 156 including a heat exchanger (HEX) 104 that is liquid cooled by a facility water source 154. An air cooled condenser could equally well be employed, and liquid cooling is chosen as an example only. Water is supplied to HEX 104 in condenser 156 through either a controlled water valve 106 responsive to the output pressure of compressor 158 or a controllable bypass valve 105 that is responsive to the controller 114. Bypass valve 105 is activated whenever a maximum cooling effort is needed. Opening valve 105 assures that the condenser 156 is supplied with the coldest water possible. This provides the system with the maximum cooling output by assuring that the condensing temperature is as low as possible. The output pressure is measured by a transducer which is contained in the coolant flow controller valve 106, which is a commercially available unit called a compressor head pressure regulator. This is conventionally applied to refrigeration systems used in applications in which the supply of cooling water may be too cold or too abundant for one significant reason or another. One typical application would use such a coolant flow controller to limit the supply of cooling water for reasons of economy or efficiency. In this invention the controller 106 is used for this purpose as well, but controller 106 primarily functions so as to maintain the output of the compressor 158 at a high pressure level for most operational modes. This high pressure is required for the compressor to be available as a strong source of heat.

An auxiliary benefit to the use of coolant flow controller 106 is so that the presently disclosed system can be a very efficient user of cooling water. This water is typically supplied in semiconductor fabrication plants from a source refrigerated by a cooling tower or other approach. The power needed to run such cooling source is a significant part of the total power used by the fabrication installation. The supply of cooling water from the source 154 to the condenser HEX 104 is varied inversely in accordance with compressor 158 output pressure so as to maintain a substantially constant compressor output pressure. The compressor control system 120 also includes an interaction with a countercurrent subcooler 130. When such subcooler is used, said interaction includes the injection of the output from a desuperheater valve 134 into the outgoing path of said subcooler combining the output of valve 134 with refrigerant gas being returned from the tool 112, thereby cooling said outgoing return flow in said subcooler 130. This incoming opposite flow into an incorporated subcooler (which is optional for some applications) is directed into expansion and control circuits, described below. The incoming flow to control the temperature of the tool through subcooler 130 is completed to the return flow input side of the subcooler 130 via the desuperheater valve 134. This arrangement and its purposes are in accordance with U.S. Pat. No. 6,446,446 by William W. Cowans.

Also, a hot gas bypass valve (HGBV) 164 is placed between the compressor output and the compressor input. The HGBV allows flow to pass directly from the compressor output to its input if the input pressure falls below a preset level. The HGBV is a standard commercial refrigeration control component. The pressure at the input to the compressor 158 cannot be allowed to fall below a certain level, which level is determined by the compressor design. This is because refrigeration compressors are lubricated by oil carried mixed in the refrigerant. At some low pressure the carryover of oil is inadequate to lubricate the compressor machinery. Refrigeration compressors are also limited in the compression ratio that can be experienced without damage occurring. This occurs due to the adiabatic heating undergone by the gas as it is compressed. At discharge gas temperatures over around 120° C. refrigeration compressors can give trouble. The HGBV 164 alleviates this problem.

The mechanism described above includes some standard approaches to compressor management in commercial refrigeration equipment but include unique approaches to the invention discussed herein, as shown in the section describing operation of the system.

The fluid in the liquid line 132 from the subcooler 130 is paralleled by the separate hot gas flow in hot gas line 159, and both lead to a mixing circuit 140. The hot gas flow in line 159 traverses a proportional valve 144, which valve is controlled by controller 114 signals which assure selected reduction in pressure in the hot gas flow provided into the mixing circuit 140. The valve 144 varies the mass flow, which ultimately varies the pressure. A separate input provided to the mixing circuit 140 from the vapor/liquid line 132 is controlled via a thermal expansion valve (TXV) 157. This operates as a normal refrigeration valve of the thermostatic expansion type. TXVs are diaphragm operated valves, one side of which diaphragm is maintained at the refrigerant pressure at a suitable point in the low pressure refrigeration circuit which the other side is at the saturation pressure of the temperature at substantially that same pressure point. A sensing bulb 124 placed at the latter point in the circuit is filled with the refrigerant gas and thus exists at a saturation pressure corresponding to the point at which the bulb is mounted to supply this saturation pressure. In the TCU circuit shown in FIG. 1 conduit 149 communicates with output line 161 at a location proximate to the bulb 124 and thus equalizes the pressure to that pressure in the low pressure level proximate to bulb 124. This is called external equalization.

If proportional valve 144 were to be fully closed, the TCU circuit shown in FIG. 1 would function as a normal vapor cycle refrigeration system. In this normal operation the TXV regulates the refrigeration output so as to produce the maximum refrigeration at which the system is capable. The action of the diaphragm-regulated TXV 157 throttles the flow of high pressure refrigerant liquid through the line in such manner as to supply the maximum amount of expanded liquid-vapor mix that can be boiled completely to pure vapor. In the principal operating mode, however, TXV 157 supplies a selected proportion of misted liquid vapor for combination with the hot gas from valve 144 when valve 144 is not fully closed. As stated above, the TXV 157 is externally equalized by the pressure communicated via the conduit 149 with the return line from the tool 112. The TXV 157 output flows through a delta P valve 155, which comprises a spring-loaded check valve establishing a fluid pressure drop (delta p) between the output of the TXV 157 and the mixing Tee 165. The total pressure across the delta P valve 155 is greater than the pressure drop across a fully open proportional valve 144 in the hot gas line when all the output of the compressor 159 is diverted to flow only across proportional valve 144. This establishes smooth control of the flow mixing from 100% hot gas to 100% expanded liquid, and overcomes the non-linear characteristics of the TXV and the fact there is always a pressure drop across the proportional valve 144 no matter how far it is opened. If the hot gas flow is full open, the check valve closes off the TXV. The output from the TXV 157 and the delta P valve 155 is therefore a saturated fluid whose temperature is essentially determined by the pressure at the output of the delta P valve 155. The pressure can be varied rapidly by changing the setting of the proportional valve 144, which changes the mass flow and thus the pressure. Thus the temperature can almost instantaneously be adjusted to correct the temperature of the tool 112, as measured by a temperature sensor 118 responsive to the tool temperature and signaling the controller 114.

The system also includes a "Close on Rise" (COR) valve 150 in the return line from the tool 112 to act as a safeguard against excessive pressure buildup in the pressure input at the compressor 158. This is a commercially available refrigeration component and is traditionally used for this purpose. In the subject invention it serves the same purpose but also allows the TCU to act as a heat pump as will be explained below.

Solenoid valve 121 is shown in the hot gas line 159 leading to the proportioning valve 144. Valve 121, which has a rapid response time, is included because in some systems it is desirable that the flow of hot gas be interrupted instantaneously to achieve cooling without the delay that might be incurred in the process of closing the proportioning valve 144. There are also some requirements for TCU systems to control loads which need to be heated instantaneously as well. To accommodate these, a solenoid valve 122 can also be used to shunt the operation of proportional valve 144. To aid in the operation of those systems in which heating needs to be applied suddenly another solenoid valve 109 can be included in the line to the TXV 157 for the purpose of shutting flow through TXV 157 substantially instantaneously. For systems needing instantaneous cooling another solenoid valve 111 can be included to shunt the operation of TXV 157.

A receiver 108 is shown in FIG. 1. This is a relatively small reservoir for refrigerant and is needed in some systems that have a requirement to hoard cooling potential while the process of heating proceeds apace. A receiver is a device that takes the liquid output of the condenser 156 and stores the condensed liquid if an amount of such liquid is produced in excess of that used by the TXV.

Downstream of the outputs of the proportional valve 144 and the TXV 157 in the mixing circuit 140 the two streams of refrigerant are combined at the mixing Tee 165. After such mixing has occurred the output flow travels through supply line 113 to cool or heat the tool 112. After leaving tool 112 the mix of vapor and liquid returns to the TCU through return line 160.

Figure 2:
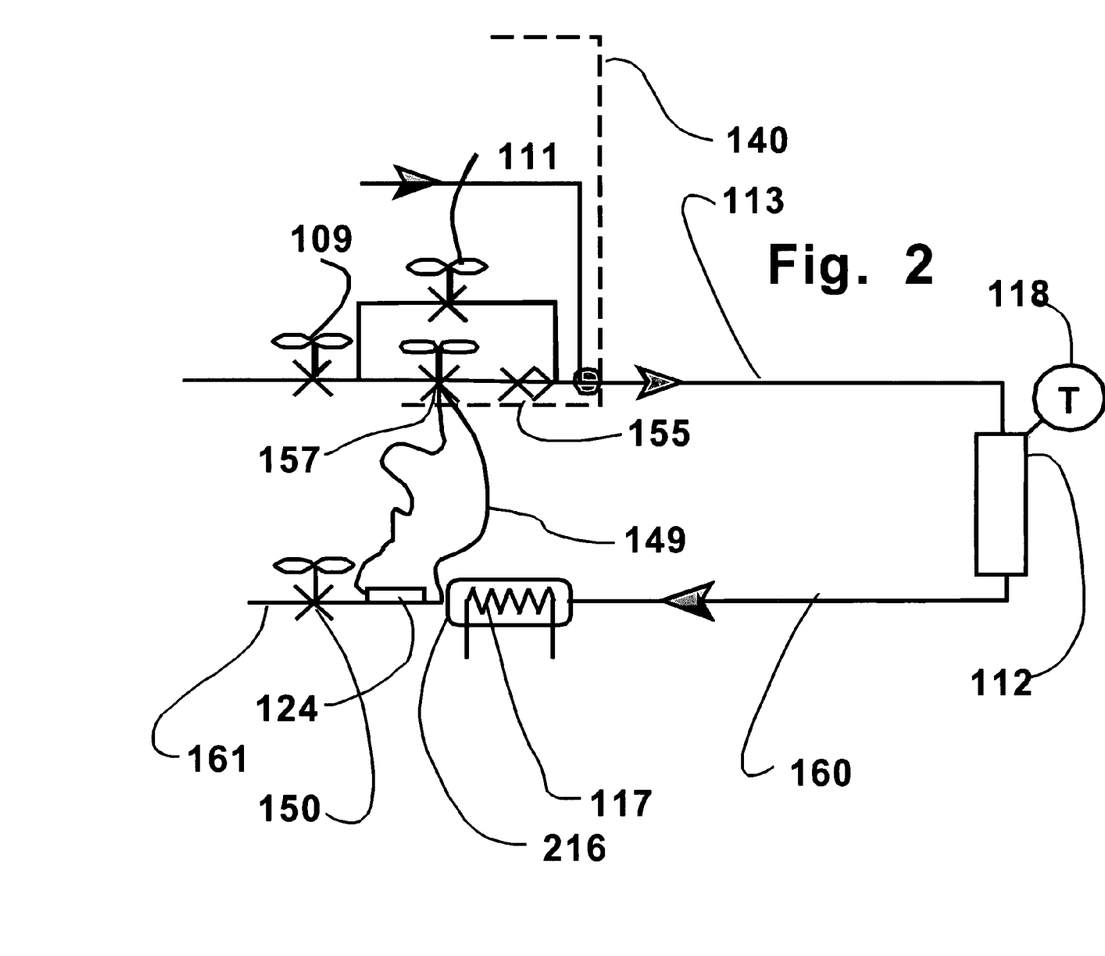
FIG. 2 is a block diagram of an alternate temperature control unit in accordance with the invention using a different method of introducing electrical heat to the system.

The first processing or conditioning of returning refrigerant that occurs in the TCU is electrical heating. This is driven by heater 117. In FIG. 1 it is shown as immersed in the liquid within a heated accumulator 116. This is one embodiment of the invention. In an alternative version shown in FIG. 2 the heater is immersed in a HEX 216, placed in good thermal exchange relation with the refrigerant passing through HEX 216. The difference between heated accumulator 116 and HEX 216 is that the accumulator has capacity for a significant amount of liquid storage and the HEX has only capacity for that amount of refrigerant necessary to carry out the heat transfer function.

As the refrigerant passes out of either accumulator 116 (FIG. 1) or HEX 216 (FIG. 2) it passes through return line 161 to which line are attached sensor bulb 124 and equalization line 149. Return line 161 thence couples with the return passage of subcooler 130. Emerging from subcooler 130 the refrigerant passes into suction line 162 through which the refrigerant returns to the suction input 163 of compressor 158.

Operation of the System

Figure 3:
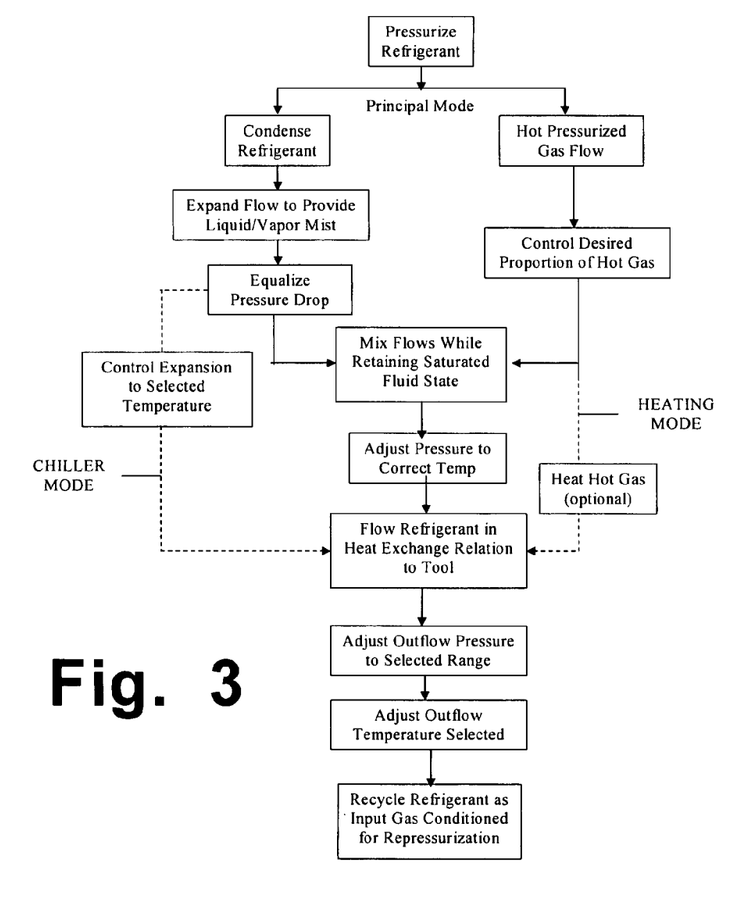
FIG. 3 is a flow chart of steps followed in practicing methods in accordance with the invention.

A counter-intuitive refrigeration cycle has thus been disclosed, which focuses on maintaining a transitional phase of saturated fluid (misted liquid and vapor) in a heat exchange relation with a system whose temperature is to be controlled, as shown sequentially in the flow chart of FIG. 3. The use of the saturated phase together with appropriate internal manipulation enables a refrigerant fluid and cycle to be employed directly for temperature control, while phase change and stability barriers not previously surmounted are overcome. By establishing liquid droplets and vapor mist in equilibrium at a selected pressure, the temperature is predetermined. Moreover, the capacity for thermal energy interchange is substantially higher than in a pure liquid or pure gaseous phase, because the dynamics of evaporation and liquefaction enhance the ability to transfer heat to a surface, as opposed to the strictly heat conductive effects existing in both the pure liquid and pure gas phases.

A temperature change with a fluid in the pure gas phase and a temperature change in the purely liquid phase are both dependent solely upon thermal energy conduction. In the intermediate region, between these pure mono-phase states a mixed liquid/vapor exists. Transport of vapor into and out of the liquid droplets can be viewed as strictly dependent on pressure or temperature, with the lower the pressure the lower the temperature of evaporation. From an equilibrium temperature, however, heat is supplied to a cooling source until all of the vapor is liquefied, or heat is taken up in evaporation, at a substantially constant temperature, until the entire mass is evaporated or condensed. This means that a liquid/vapor mix can be used as a constant temperature sink or source and, contrary-wise, that by varying the pressure, the temperature of a unit in thermal exchange relation with the liquid/vapor mix can be varied. It is significant that this variation can be extremely rapid because of the fact that pressure changes are transported through a fluid at the speed of sound; hundreds of meters per second.

Referring to FIG. 1 the crucial mixing zone comprises the elements within mixing system 140 which includes the hot gas output from the proportional valve 144 and the output of liquid and vapor from TXV 157, both of which branch from the compressor 158 output line 102. Using an output pressure of 400 psi, by way of example, the liquefied output from the cooled condenser 156 to the TXV 157 will be at a substantially like pressure. After expansion at the TXV 157, as commanded by controller 114, the TXV 157 provides a misted liquid flow. This can be viewed classically as a dispersion of droplets within a surrounding atmosphere of liquid vapor. The heat exchange characteristics of this misted liquid are in accordance with the equation set out by McAdams, W. H. in the book "*Heat Transmission*", Third Edition, McGraw-Hill Book Company, New York, 1954, p. 335 & 402. Combination of the misted liquid with a controller-determined hot gas flow also incoming at the mixing head 165 results in diminution by a controlled amount of the size of the droplets brought about by the need to equilibrate the temperature within the total mix of liquid and vapor from TXV 157 with the hot gas from proportional valve 144. This process of mixing hot gas from 144 with liquid/vapor from TXV 157 thus can supply a controlled temperature and output pressure of refrigerant at the input to controlled tool 112. Mixing circuit 140 further includes the delta p valve 155, which introduces a pressure drop substantially no greater than the inherent drop in the proportional valve 144, when said proportional valve 144 is wide open. Furthermore, the mixing head 165 and delta p valve 155 prevent back-flow of the mix into the liquid/vapor line 132 when valve 144 is wide open.

Figure 4:
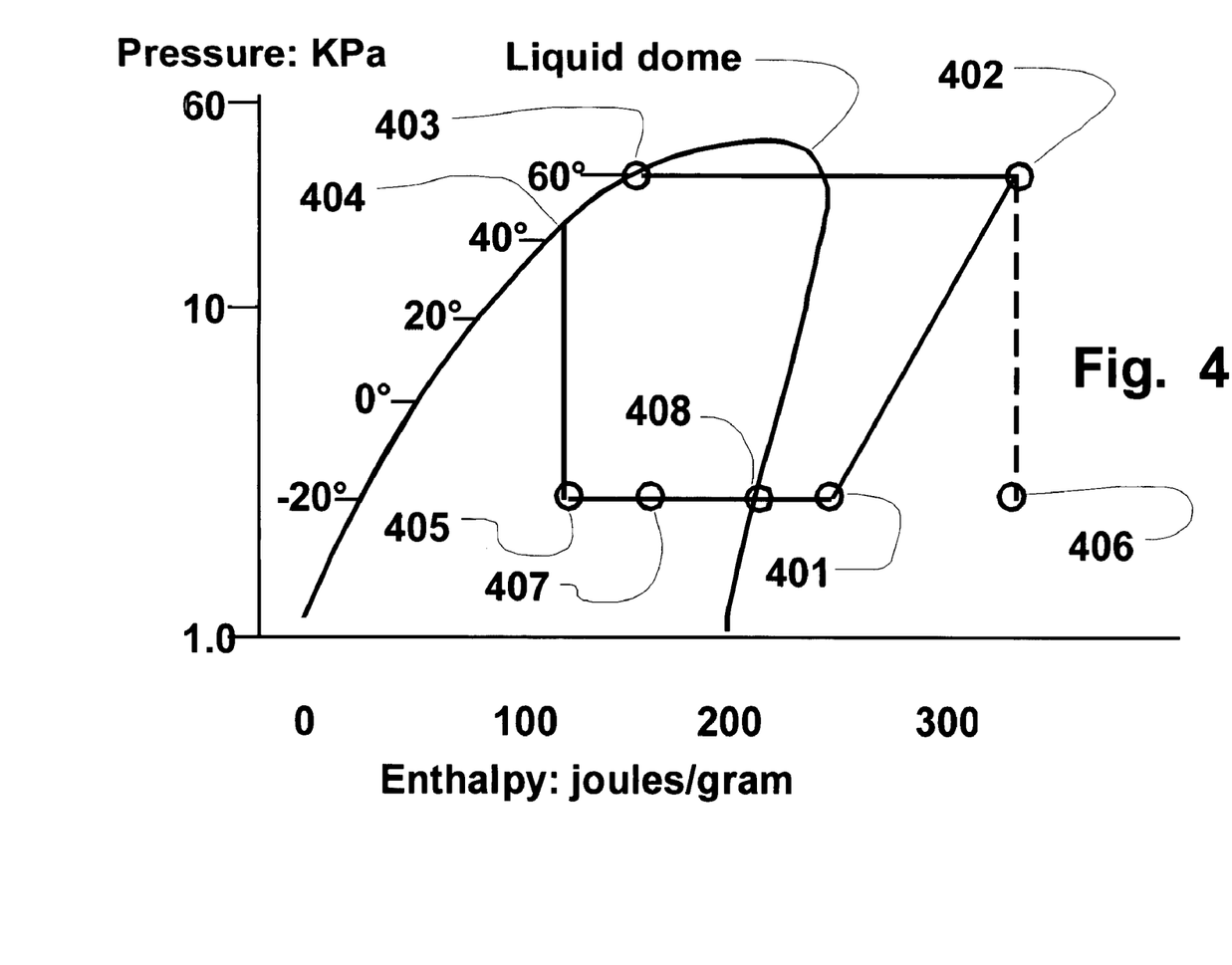
FIG. 4 is a graphical chart of variations in pressure vs. enthalpy during an energy transfer cycle in the system and method showing a cycle effective at −20° C.

A typical refrigeration circuit (with subcooler) is shown as operating in the classical thermodynamic cycle 401 to 402 to 403 to 404 to 405 and back to 401 in FIG. 4. By plotting pressure against enthalpy in the circuit in this manner, one can see that the compressor 158 of FIG. 1 drives the pressure upward and also drives the enthalpy higher, giving the line 401 to 402 a slope showing increases in both amplitudes. Condensation of the compressed gas lowers the enthalpy, while maintaining the pressure, as shown by the constant pressure line 402–403. This shift moves the refrigerant through the liquid dome shown on the PH chart, causing liquefaction of the refrigerant while maintaining the pressure. The evaporation point of the refrigerant is about 45° C. at 400 psi. In the classical refrigeration cycle, the pressure is dropped to a selected level, without changing the enthalpy, as the refrigerant is expanded, as shown from points 404–405. The expanded refrigerant, released as liquid/vapor mixture, moves through the liquid dome transition in the line from 405–401, and is directed through the heat exchange area. The gas is recompressed following point 401 and the cycle is repeated.

The present invention modifies the basic refrigeration cycle to accomplish the objectives of a modern TCU with more flexibility. The Mollier diagram (a display of enthalpy versus temperature in the vicinity of the liquid dome) of refrigerant (type R 507) shown in FIG. 4 shows the operation of the refrigerant in providing a flow of liquid and vapor at −20° C., which temperature is chosen as an example. The invention provides for a variation in the heating or cooling capabilities of the fluid under rapid control of the unit. The refrigeration cycle is shown from point 401 which is taken at the compressor input 163 (FIG. 1). The gas is compressed to point 402, which point is about 30 KPa (ca. 400 psig) at a temperature of about 120° C. Gas that enters the condenser 156 is cooled and liquefied to point 403 at a temperature of around 60° C. This liquid is passed through subcooler 130. In this component the liquid is cooled by exchanging heat with the refrigerant returning from the tool 112 in line 161. Liquid refrigerant thus cooled in subcooler 130 is then expanded through TXV 157 to point 404. At this point the refrigerant is at a temperature of around −20° C. and consists of about 50% gas and 50% liquid in the current example. This is mixed with hot gas expanded through proportional valve 144 and depicted on FIG. 4 by the dotted line path from point 402 to point 406 which, in the present example would be at a temperature of about 85° C. The addition of heat from gas at 85° C. mixing with the liquid/vapor at point 405 results in a total mix at point 407. This controlled mix is about 70% gas and 30% liquid. The addition of the hot gas has boiled off the difference of 50% liquid at point 405 and the hot gas added has been cooled to −20° C. In the example given the mixture boils off liquid in cooling the tool 112 and further heats as it gains heat from the surrounding environment to point 408. This gas then enters subcooler 130 and is heated close to ambient temperature by absorbing heat from the counterflowing liquid refrigerant being cooled from 403 to 404, then drops in pressure and increases in enthalpy to point 401 wherein the cycle is repeated.

In consequence, as one can deduce from a study of FIG. 4, there is a range of operation in which the liquid/vapor mix, dependent upon the pressures maintained, stabilizes the temperature of the tool 112. If the tool is giving up heat to the fluid, and is to maintain a given temperature T, shown as −20° C. in FIG. 4 as an example, as determined at the tool 112 by the sensor 118, pressure is adjusted in the flow of vapor/liquid in supply line 113 by adjusting the opening of valve 144 to change the mass flow rate. This alters the temperature accordingly in line 113 as vapor and liquid equilibrate at the adjusted saturation temperature in order to hold the temperature of the tool constant. In cases of extreme heating the flow from the TXV 157 can be shut off entirely by fully opening the proportional valve 144. In this case the entire flow though the tool 112 is derived (see FIG. 4) from the flow of gas at point 406. This gas is at a temperature around 80° C. and thus can heat tool 112 rapidly.

The system is further stabilized by the external equalization feedback path from a pressure bulb 124 at the tool 112 output. As is known with thermal expansion valves, transmission of the pressure return to TXV 157 from the pressure line 149 helps to assure that there is no offset because of any pressure losses in the lines or in the tool 112.

Figure 5:
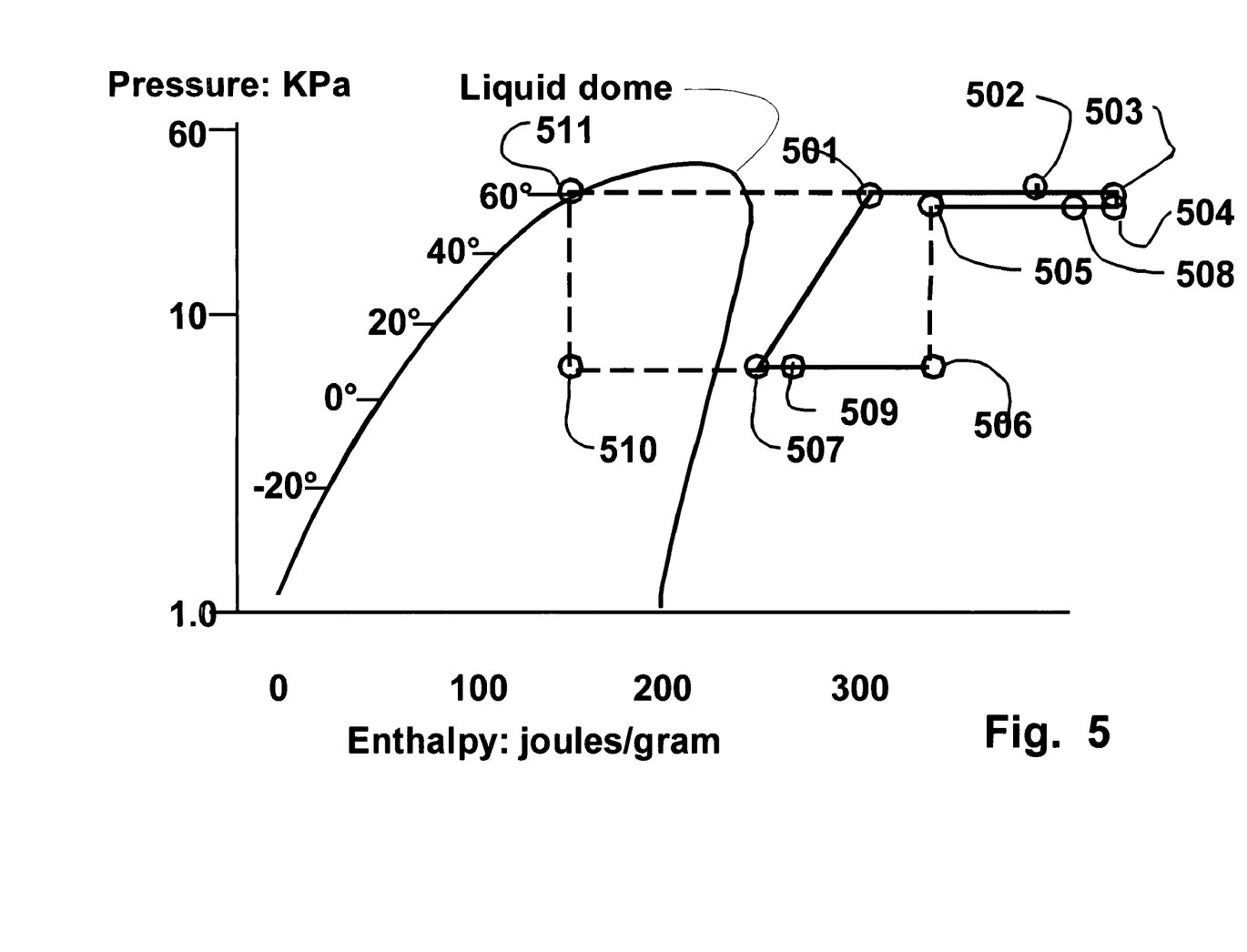
FIG. 5 is a graphical chart of variations in pressure vs. enthalpy during an energy transfer cycle in the system and method showing a heating cycle effective at over 120° C.
Figure 7:
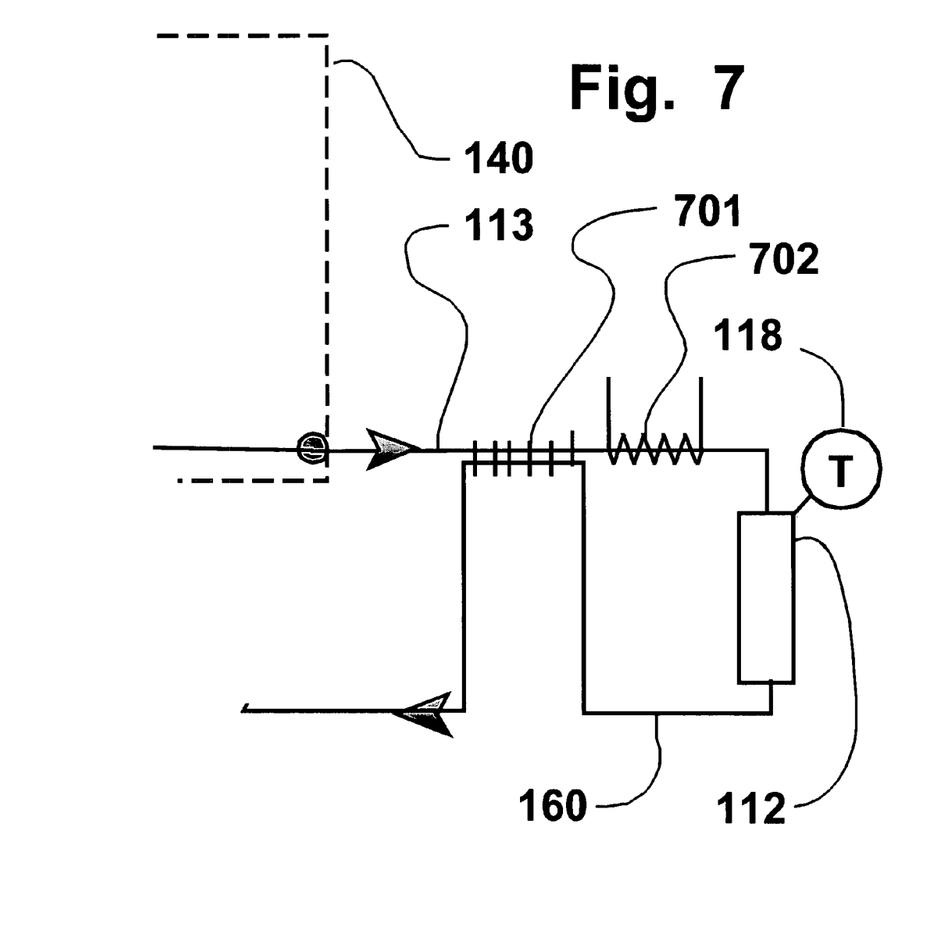
FIG. 7 is a block diagram of details of a system feature for use in heating the output of the TCU above 120° C. employing an auxiliary electric heater and a counter current HEX in a system such as FIG. 1.

The invention can be used to provide heat at an elevated temperature outside the bounds limited by the liquid dome. FIG. 5 shows the operation of the invention in this mode, in which the system operates both inside and outside the zone of liquefaction in adjusting thermal energy. The operation depends on the addition of a heater at the output of the mixing circuit 140. FIG. 7 shows alternatives to the basic system presented in FIG. 1 that are employed to incorporate this ability. In the supply line 113 to the tool 112 downstream of mixing circuit 140 an electrical heater 702 is placed in good thermal contact with the supply line 113. A counter current HEX 701 is also placed in line 113 and additionally intercepts return line 160 to receive the outgoing flow from tool 112. The use of a counter current HEX to isolate the temperature of line 113 on the side of HEX 701 that is closest to the tool from the line 160 into the other side of HEX 701 allows the attainment of even higher temperatures. With this feature refrigerant gas at temperatures as high as 260° C. or even higher can be supplied to tool 112.

FIG. 5 shows the thermodynamic performance of the TCU fitted with a subsystem such as in FIG. 7. Refrigerant gas enters the compressor at point 507. It is then compressed to about 30 KPa at point 501 where the gas enters HEX 701. In the countercurrent HEX 701 the input gas is heated to point 502 in absorbing heat from the outgoing gas as it is cooled from point 508 to point 505. The electrical heater 702 then heats the input gas from point 502 to point 503 which is the temperature at which the gas enters tool 112, assuming there is negligible loss in gas temperature as it passes from heater 702 to tool 112 through line 113. The gas is cooled in the process of heating tool 112 from point 504 to point 508. At point 508 the gas enters HEX 701 and cools to point 505 in heating the input gas on the other side of HEX 701. The gas then passes through COR valve 150 and drops to a pressure at point 506 suitable for the compressor 158 input. The gas would be ready to restart its cycle and be compressed again except it is too hot for successful operation of the compressor. In the system of FIG. 1, however, the hot gas mixes with the output of desuperheater valve 134 which is opened in response to the sensor 126 at the compressor 158 input. This action adds a fraction of condensed refrigerant at the return side of the subcooler 130. The combination of the condensed liquid fraction from the condenser 156, which is at point 511 in FIG. 5 with the returning hot gas (lowered in pressure to point 510), provides the input gas at a temperature appropriate for compressing at point 507. The system therefore operates, after compression and condensation, in a hot gas mode outside the thermodynamic liquid dome demarcated in pressure and enthalpy parameters.

Figure 6:
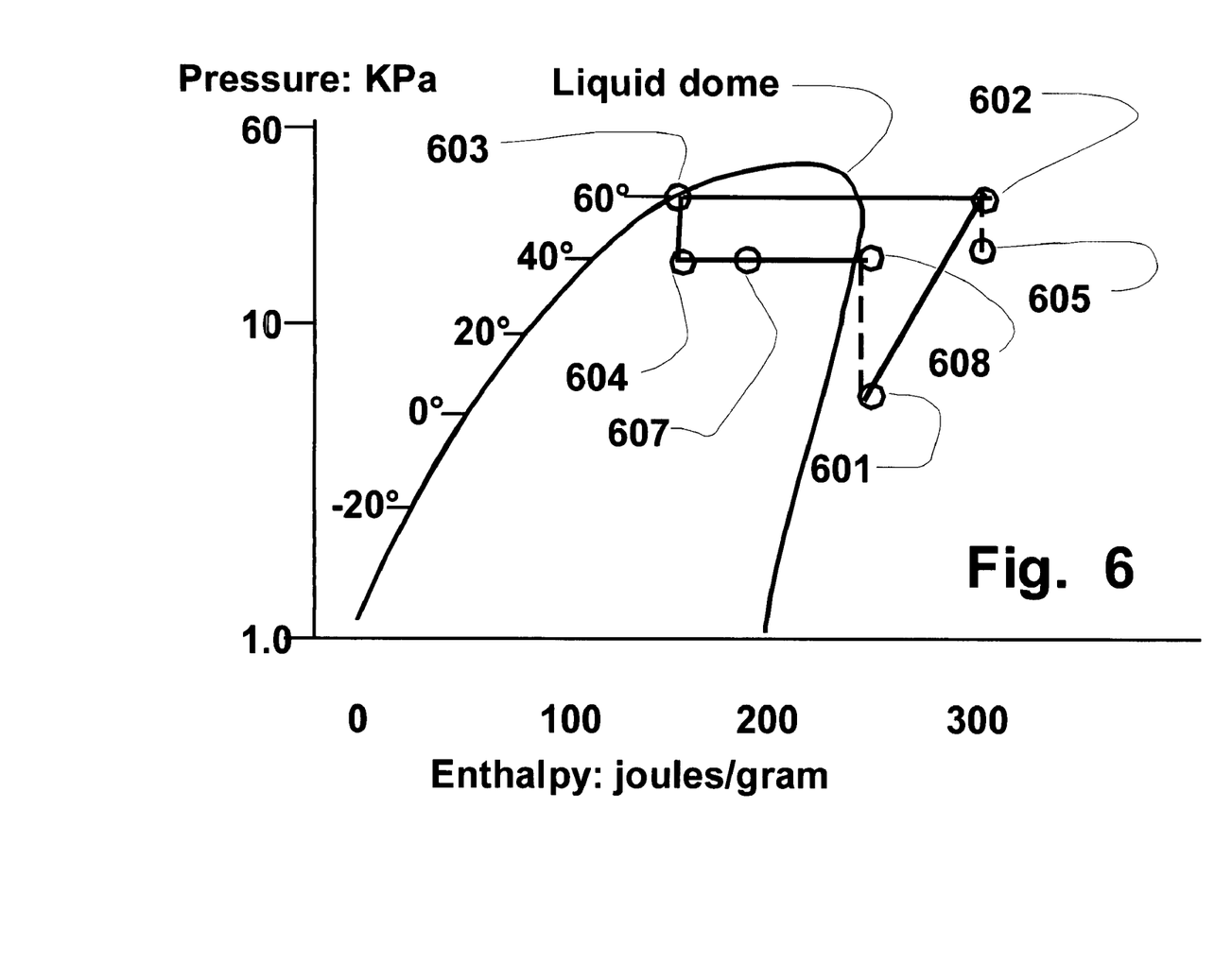
FIG. 6 is a graphical chart of variations in pressure vs. enthalpy during an energy transfer cycle in the system and method, showing a cycle effective at +40° C.

The operation of COR valve 150 can come into play at lower temperatures under particular circumstances. If the TCU is called into operation at a temperature significantly over 10° C. the pressure at which liquid and gas equilibrate in the refrigerant will be too high for successful compression in conventional compressors. Referring to FIGS. 1 and 5, COR valve 150 protects the compressor 158 when, as is shown in FIG. 6, the TCU is being called on to cool a load at 40° C. (in a manner similar to that shown in FIG. 4 wherein the tool was cooled with refrigerant at −20° C.). FIG. 6 shows the gas being compressed from point 601 to point 602. Some of this gas then is condensed at the same pressure to point 603 and expanded through TXV valve 157 to point 604. The remainder of the compressed gas is allowed to pass through the proportional valve 144 to point 605. The two streams are then combined in mixing circuit 140 to exit at an intermediate pressure and enthalpy point 607. The liquid in this mixture, which is supplied to the tool 112, is then evaporated in cooling tool 112 to point 608. The gas at this point is then processed automatically in COR valve 150 to expand to a lower pressure suitable to enter compressor 158 at point 601. The cycle then repeats.

Figure 8:
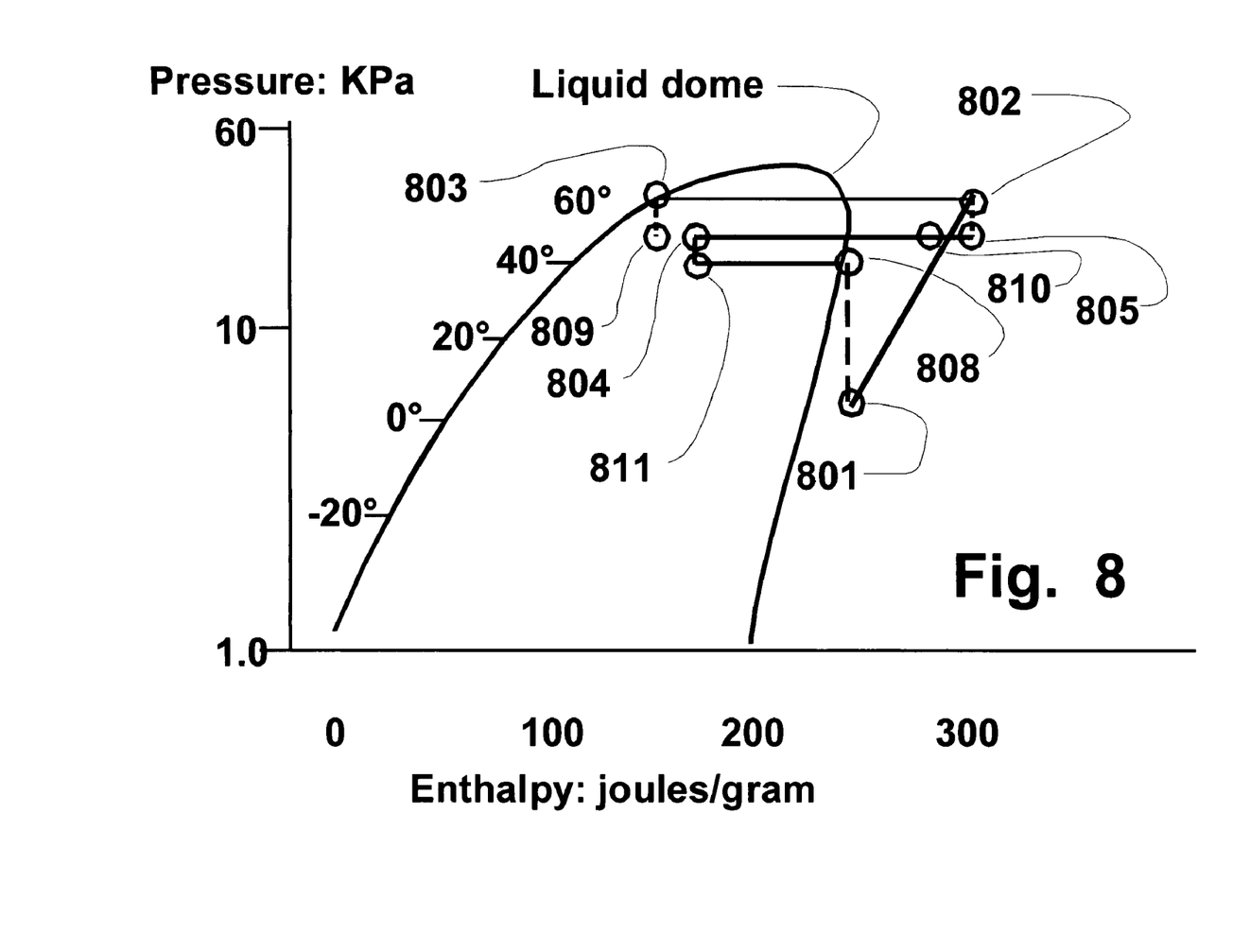
FIG. 8 is a graphical chart of variations in pressure vs. enthalpy during an energy transfer cycle in the system and method, showing a cycle effective in heating at +40° C. using a heat pump capability of the unit.

The TCU can perform as a heat pump in supplying heat at a desired point. This is shown in FIG. 8 which should also be considered along with FIG. 1. The operation shown herein is for supplying close to maximum heating at a temperature around 40° C. After being compressed from point 801 to point 802 most of the hot gas from compressor 158 is passed through the proportional valve 144 to a lowered pressure at point 805. Controller 114 mixes an amount of condensed but high pressure liquid at point 803 that has been expanded through TXV 157 to point 809 with the gas at point 805 to provide a mixture at point 810. The combination is then passed through tool 112 giving up heat to tool 112 in condensing liquid to point 804. If the mix at point 804 were to be passed through COR valve 150 and input for compression in compressor 158 there would be so much liquid in the mix at point 804 that the compressor energy would be dissipated in evaporating liquid and the output pressure of compressor 158 would be too low. A pressure switch 168, shown in FIG. 1 senses this and activates heater 117 whenever the pressure sensed by switch 168 is below the threshold value. This action heats the liquid/vapor mix at point 811 and heats it to point 808 outside the liquid where it enters COR valve 150 and expands to point 801 where it then is all gas and ready to be recompressed.

There are, however, a number of other factors that can arise, particularly with respect to improvement of energy efficiency and safe, reliable operation. At the input to the compressor 158 the return line from the tool 112 passes through the subcooler 130, acting to exchange heat energy between the condensed fluid from the condenser 156 and minimize loss of thermal energy by further cooling the fluid in the liquid line 132. To assure that the mass flow at the compressor 158 input is sufficient, and above a potentially damaging minimum a loop from the output of the compressor 158 is fed through the HGBV valve 164 which ensures that the input to the compressor does not fall below a fixed pressure. The desuperheater valve 134 with a sensing bulb 126 at the compressor input ensures that the input to compressor 158 is cool enough for proper operation. The output of the desuperheater valve 134 is first passed through the liquid in the receiver 108, when a receiver is used, and then feeds back to the return line into subcooler 130, which passes through to the compressor 158.

A separate control is effected at the condenser 156. When the compressor 158 output is sensed by the pressure sensor 118, and a signal is returned to the controller 114, the consequent variation of the facility water source 154 assures that the condenser 156 is cooled sufficiently by the HEX 104 to maintain the refrigerant flow in the liquid line 132 substantially constant.

This system therefore provides a highly efficient heat exchange system in which the refrigerant is used directly under variable load conditions but maintained in a controlled, misted liquid/vapor phase when in contact with the tool 112. This control in a principal mode is maintained by the controller 114 adjusting the proportions of the hot gas and the expanded liquid refrigerant at a selected pressure as determined by the heating or cooling needs of the tool 112 at a specific target temperature. Subsequent heat exchange in the tool itself may well occur, and the system and method stabilize or condition the refrigerant throughout the cycle. In the hot gas mode, with no flow in the liquid line 132, the proportional valve 144 is opened to create the flow rate and temperature at the tool needed for maintenance of the target temperature, which with R507 refrigerant is thereby approximately 150° or more. For employing refrigerant in the lowest temperature range, only liquid line 132 need be used, and the TXV 157 is controlled to provide a cooling output to the tool 112 down to about −40° C.

As previously noted, other refrigerants can be used and the system can be designed to operate in a different mixed mode cycle of higher or lower value than the figures given.

It is to be appreciated that although different flow and variations have been disclosed the invention is not limited thereto but encompasses all alternatives and expedients within the scope of the appended claims.

The invention claimed is:
1. A method of controlling the temperature of a thermal load by utilizing a vaporizable fluid comprising the steps of:
  pressurizing the vaporizable fluid from a gas to a high pressure, high temperature gaseous state;

condensing at least some of the high pressure gas to a pressurized liquid state;

expanding at least some of the pressurized liquid to a saturated vapor at a lower temperature and pressure;

mixing a selected proportion of the high pressure, high temperature gas with the expanded saturated vapor to provide a saturated vapor mist at a selected pressure;

passing the mixed flow through the thermal load to control the temperature thereof;

adjusting the temperature of the thermal load by adjusting the pressure of the mixed flow; and restoring the flow from the thermal load to a gas suitable for repressurization.

2. The method as set forth in claim 1 above, including the step of varying the mixed flow pressure by varying the proportion of the high temperature gas in the mixture.

3. The method as set forth in claim 2 above, wherein the saturated vapor mist is maintained in a principal mode range in which a change in pressure includes thermal energy transfer by virtue of the latent heat of vaporization or condensation.

4. The method as set forth in claim 3 above, including the step of providing a high temperature range in which the flow is exclusively high temperature gas.

5. The method as set forth in claim 4 above, including the step of additionally heating the high temperature gas before passing to the thermal load.

6. The method as set forth in claim 3 above, further including the step of sensing the temperature of the controlled thermal load, and adjusting the proportion of the high pressure gas flow in accordance with a target temperature.

7. The method as set forth in claim 2 above, further including the step of heating the output flow from the thermal load in response to a pressure level that is below a selected minimum in the pressurized vaporizable liquid.

8. The method as set forth in claim 2 above, further including the steps of cycling fluid returned from the thermal load back to be pressurized, and maintaining the input temperature of the fluid below a selected maximum before repressurizing.

9. The method as set forth in claim 8 above, including the step of desuperheating the fluid returned for repressurization by injecting condensed fluid into the return line.

10. The method as set forth in claim 2 above, further including the steps of sensing the level of pressurization of the high pressure, high temperature gas and heating the return flow from the thermal load, when the pressure is below a selected limit, so as to increase the power available.

11. The method as set forth in claim 2 above, further including the step of interchanging thermal energy between fluid being returned from the thermal load and condensed fluid in a pressurized liquid state.

12. The method as set forth in claim 2 above, including the step of storing a portion of the pressurized liquid after condensation if it is not needed for immediate expansion.

13. The method as set forth in claim 2 above, including the further step of enabling rapid transitions between temperature levels at the thermal load by selective rapid termination of the first and second flows.

14. The method as set forth in claim 1 above, including the step of maintaining the pressure drop between the expanded flow and the variable high temperature gas flow substantially equal before mixing.

15. A method of controlling the temperature of process equipment with internally flowing fluid comprising the steps of:

selecting a fluid whose transition temperatures for liquefaction and evaporation are suitable for the desired temperature operating range of the process equipment;

pressurizing the fluid to a high temperature, high pressure gas;

cooling a first flow of the pressurized gas to provide a saturated fluid;

transferring a variable second flow of pressurized gas to a mixing zone;

controllably expanding the first flow state to a liquid/vapor state before the mixing zone;

selectively mixing the selected proportion of high temperature gas with the liquid/vapor flow to provide a saturated fluid mixture at a controlled temperature level;

transferring the saturated fluid mixture through the process equipment to effect direct heat exchange;

adjusting the pressure of the saturated fluid mixture to vary the temperature of the process equipment, and recycling the fluid for repressurizing and repeating the cycle.

16. The method as set forth in claim 15 above, wherein the fluid is a vaporizable refrigerant, and the process equipment represents a variable thermal load.

17. The method as set forth in claim 15 above, wherein the step of returning a gas input for repressurizing further includes the steps of desuperheating the return flow in accordance with input temperature above a predetermined level, and heating the return flow in response to lowering of pressurization levels below a selected range.

18. The method as set forth in claim 17 above, further including the step of interchanging thermal energy between condensed pressurized fluid and expanded liquid/vapor mix returned from the process equipment, and wherein the heating of return flow includes sensing the level of pressurization and heating the return flow immediately after the process equipment.

19. The method as set forth in claim 15 above, further including the steps of sensing the temperature of the process equipment, and adjusting the temperature of the mixed flow by adjusting the proportion of the second flow, and processing the return flow to provide that it is free of liquid and within selected pressure and temperature ranges for repressurization.

20. The method of controlling the temperature of a process tool with a fluid comprising the steps of:

compressing a refrigerant having a liquid/vapor state dependent on pressure and temperature to a high pressure gaseous state in the range of about 120° C. and about 400 psi;

condensing a portion of the flow in the gaseous state to a high pressure, liquid state at approximately ambient temperature;

expanding a part of the condensed refrigerant flow to a liquid/vapor mix at a selected temperature;

mixing a selected proportion of the high pressure gaseous flow with the expanded flow to achieve a selected nominal temperature and pressure in the mix;

passing the refrigerant flow directly in heat exchange relation with the process tool;

adjusting the temperature of the process tool by adjusting the proportion of the high temperature gaseous flow while maintaining a liquid/vapor mix, and conditioning the temperature and pressure of the refrigerant in selected ranges to return a gaseous refrigerant suitable for recycling and recompression.

21. A method as set forth in claim 20 above, wherein the process tool provides a variable thermal load and the refrigerant flow therethrough is controllable in a principal mode to maintain between about −50° C. and +140° C. at the process equipment.

22. A method as set forth in claim 20 above, further including a heating mode operating up to about 250° C., and comprising the steps of using a high proportion of high temperature compressed gas without maintaining a saturated fluid, and adding heat to the gas to reach a final target temperature.

23. The method as set forth in claim 20 above, wherein the refrigerant is liquefied when in a predetermined pressure-enthalpy state, and wherein the method includes the step of combining refrigerant flows in liquefied and gaseous states at substantially like pressures.

24. The method of exchanging thermal energy between a vaporizable fluid and a process unit of variable thermal load whose temperature is to be controlled, comprising the steps of:
    converting the fluid to a pressurized high temperature gaseous state;
    condensing a first portion of the pressurized gas to a liquid at the pressure at a predetermined pressure;
    diverting the remainder of the pressurized gas at approximately the predetermined pressure into a separate path;
    expanding the pressurized liquid to a saturated fluid of a selected pressure to arrive at a first pressure and enthalpy level;
    extracting a selected proportion of the pressurized gas to provide an adjusted pressure and enthalpy level;
    mixing the expanded saturated fluid and the extracted portion of the gas to provide a fluid of target pressure and enthalpy;
    passing the mixed fluid of target pressure and enthalpy through the process unit in thermal exchange relation to be condensed or evaporated depending on the thermal load thereat;
    adjusting the process unit temperature level to a new level by adjusting the pressure of the mixed fluid;
    transporting the mixed fluid for recycling while restoring the pressure and temperature to within predetermined limits, and
    reconverting the mixed fluid to a pressurized high temperature state.

25. A method as set forth in claim 24 above, further including the steps of introducing a compensating pressure drop in the expanded saturated fluid to establish smooth control of the two flows to be mixed, irrespective of their relative proportions, and restoring the pressure and temperature before repressurizing by heating the return flow if the repressurization pressure is below a set minimum.

26. A method as set forth in claim 25 above, wherein the step of restoring the temperature and pressure includes desuperheating the mix before repressurization if the input temperature is above a maximum and the method further includes the step of reducing the input pressure if it is above a selected maximum.

27. A method as set forth in claim 24 above, wherein the step of adjusting the process unit temperature comprises employing a refrigerant in a misted droplet phase as the vaporizable fluid.

28. A method of using a refrigerant as a direct heat exchange medium for controlling the temperature of a controlled unit with which it is in thermal contact comprising the steps of:
    compressing the refrigerant to a high temperature high pressure vapor state;
    condensing a first flow of the compressed refrigerant to a liquid;
    forming a first flow of misted vapor form from the condensed liquid;
    combining a selected proportion of a second flow, of the high temperature and high pressure vapor with the first flow to form a controlled pressure mixture, and
    directing the combined flow in thermal exchange relation with the controlled unit.

29. The method as set forth in claim 28 above, wherein the refrigerant is first compressed to a pressure which is above its evaporation point and then condensed by rejection of heat to below its evaporation point at the established pressure, and the temperature of the combined flow is changeable by varying the pressure of the mixture while maintaining the mixture as fluid particles encompassed in compatible gas, such that internal energy is exchanged in large part by evaporation or condensation between the fluid particles and the surrounding gas.

30. A method as set forth in claim 29 above, wherein the refrigerant has an evaporation point of approximately 45° C. at ambient pressure, wherein the refrigerant is compressed to approximately 400 psi, and wherein the mixture is maintained in gas/liquid form between the temperatures of about −50° C. and 140° C. at ambient pressure.

* * * * *